Sept. 5, 1950 W. T. GOLLWITZER ET AL 2,521,118
CARD PUNCHING MACHINE
Filed Feb. 16, 1946 5 Sheets-Sheet 4
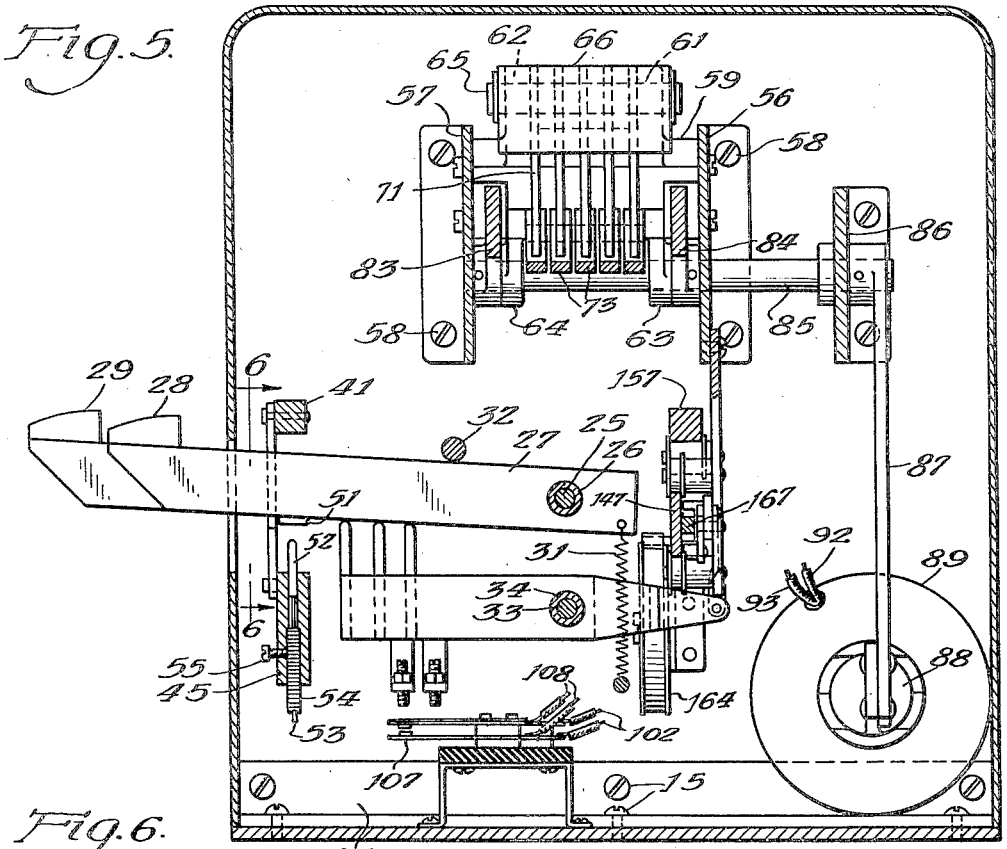
Inventors:
Walter T. Gollwitzer
John H. Gruver
By Wallace and Cannon
Attorneys

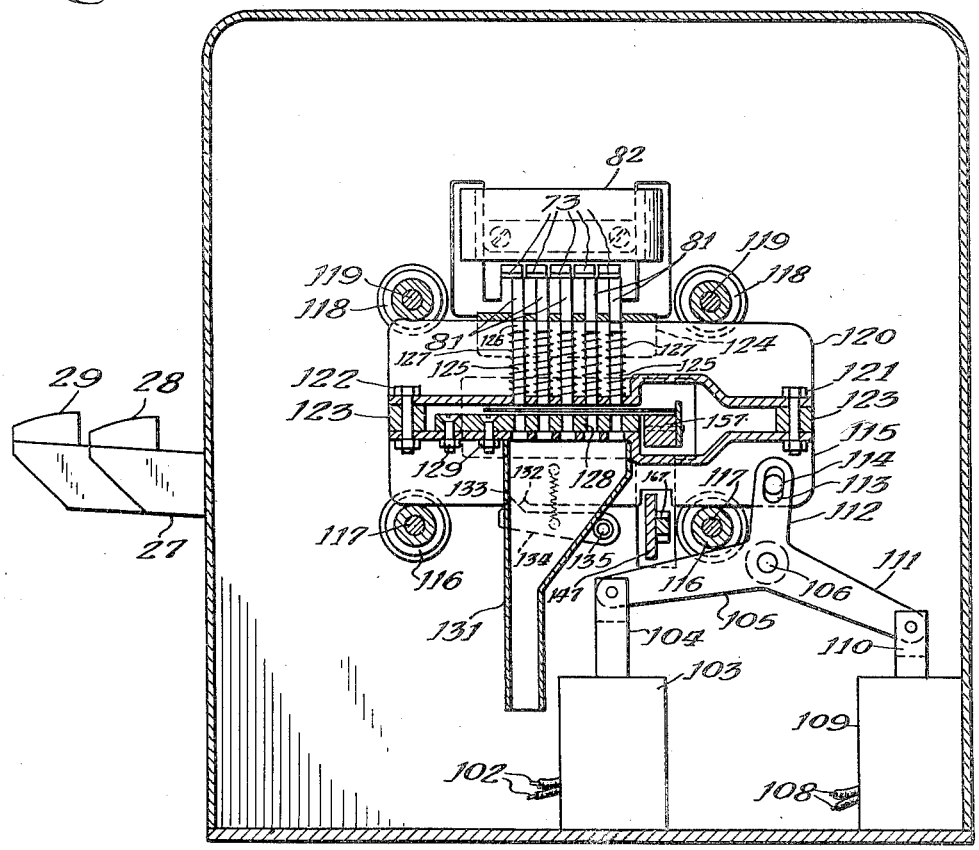

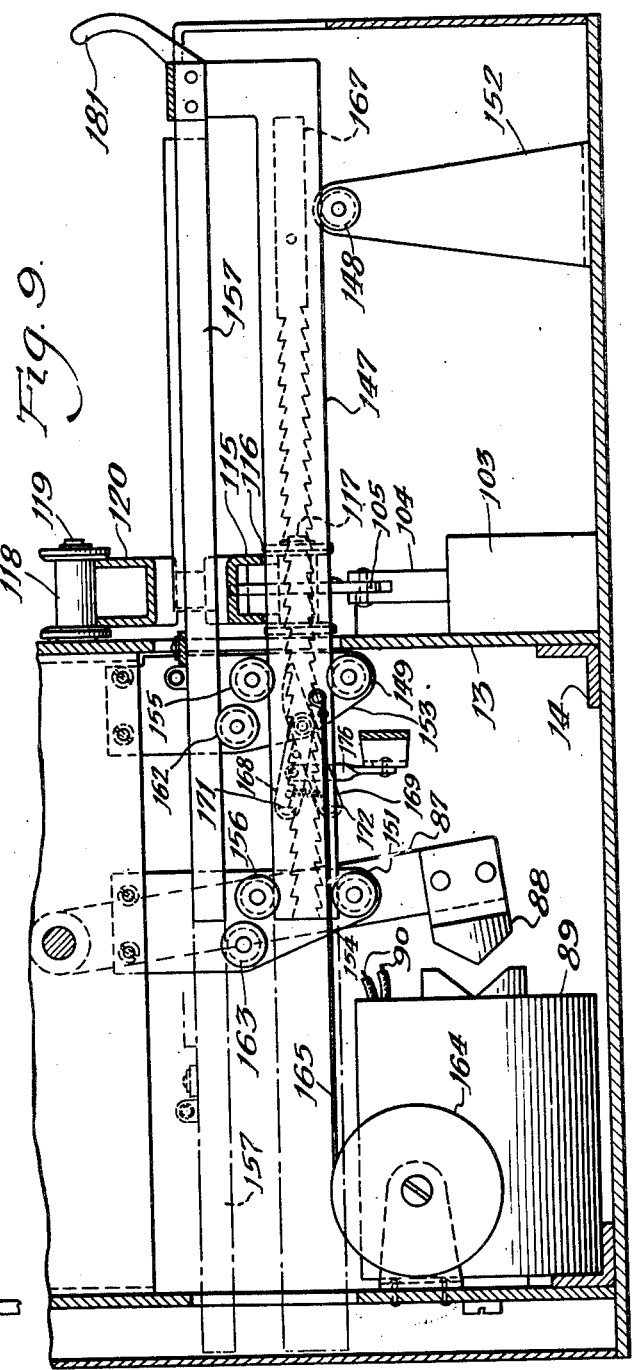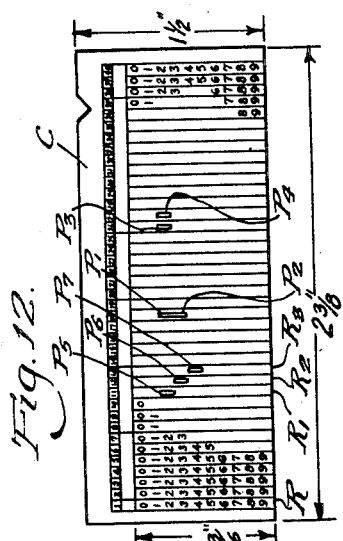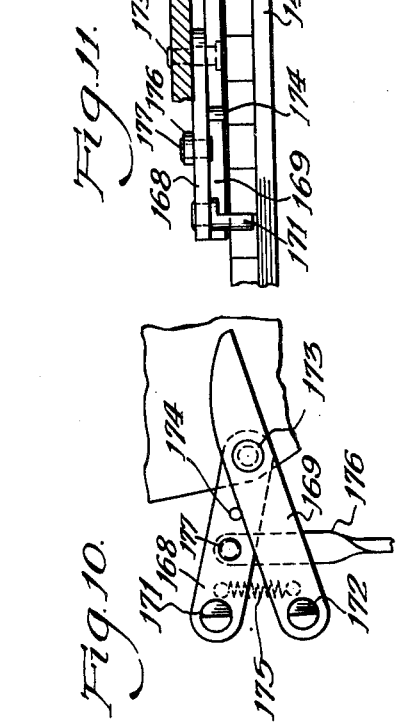

Patented Sept. 5, 1950

2,521,118

UNITED STATES PATENT OFFICE 2,521,118

CARD PUNCHING MACHINE

Walter T. Gollwitzer, Euclid, and John H. Gruver, East Cleveland, Ohio, assignors to Addressograph-Multigraph Corporation, Wilmington, Del., a corporation of Delaware Application February 16, 1946, Serial No. 648,075

2 Claims. (Cl. 164—113)

This invention relates to card punching machines of the kind used to produce data representing perforations in cards of the type utilized in accounting and like operations in business establishments.

The data that may be represented by coded perforations in record cards of the aforesaid character may, of course, be either numerical or alphabetical, and the representation may be effected either by single element or multiple element codes, a wide variety of which are well known and established in the art. The amount of data that may be represented by perforations in a record card of a particular size is, of course, an important consideration in determining whether or not a punched card system of accounting or the like is to be adopted in a particular situation, and the present invention is concerned primarily with enabling the amount of data that may be carried by a card of a particular size to be materially increased. In the representation of either numerical or alphabetical data by the means of coded perforations in cards or the like, the total area that must be allocated in a card for the representation of a single item of such data determines in a large measure the size of card that must be employed in order to enable a particular number of individual items of data to be represented on such card, and more specifically, it is an object of the present invention to enable the area that must be allocated on a card for the representation of a single item of data to be materially reduced, thereby to enable the overall size requirements in such cards to be reduced.

For the purpose of illustrating the foregoing more in detail, it may be pointed out that an extremely high percentage of the cards used in punch card systems of accounting and the like are conventionally termed Hollerith tabulating cards, and are made in a 3¼ by 7⅜ inch size. One such card is illustrated in Lasker Patent 1,780,621, while another such card, using a rectangular rather than a circular perforation, is illustrated in Fig. 2 of Lake Patent No. 1,772,492. As between the aforesaid tabulating cards illustrated in the Lasker patent and the Lake patent, the primary difference is afforded by the shape of the perforation, the rectangular perforation of the Lake patent being such as to enable a closer spacing of the columns with a resultant increase in the amount or number of items of data that may be represented on cards of the aforesaid standard dimensions.

In contrast to the tabulating or record cards illustrated in the aforesaid Lasker patent and Lake patent, the present invention is concerned with the elimination of the wasted or unused vertical areas that in the cards of such Lasker and Lake patents are afforded between each of the vertically adjacent positions in each column at which perforations may be formed, and it is a further and more specific object of the present invention to enable such waste space in the individual columns to be eliminated.

It is an object of our invention to provide a novel and improved apparatus for punching closely spaced index points or data-representing positions without greatly weakening the card structure or materially reducing the sizes of the perforations to be sensed subsequently by conventional sensing means known to the prior art.

It is a further object of our invention to provide a simple, small, and compact punching machine capable of rapid and accurate operation upon small cards having closely spaced index points or data-representing positions. More specifically, it is an object of our invention to provide a punching machine having a relatively small number of punching elements and associated parts which are capable of producing accurately located perforations at more index points or data-representing positions than there are punching elements.

A still further object of our invention is to provide a punching machine having laterally shiftable male and female punching dies and operating under the control of a simple keyboard to shift to plural positions, thereby multiplying the number of index points or data-representing positions which may be punched by a fixed and limited number of punching dies. Yet a further object of our invention is to provide a simple and sturdy punching machine, controlled by a simple keyboard with as many keys as there are index points or data-representing positions in a row or column on a card to be selectively punched, plural keys being arranged to selectively control a single punching die assembly to produce a perforation at a selected position of plural positions where said single assembly is capable of operating.

Another object of our invention is to provide a simple, small and compact punching machine adapted to feed cards line by line, row by row, or column by column, under the control of a simple keyboard and associated punching means as set forth in the foregoing paragraph.

Other and further objects of the present invention will be apparent from the following description and claims, taken in connection with the accompanying drawings which show a preferred embodiment of our punching machine and the principle thereof. Other aspects of our invention will become apparent as this description proceeds. While we will now describe the best mode in which we contemplate applying the principle of our invention, other embodiments employing the same principle or equivalents may be used, and structural changes may be made as desired by those skilled in the art to which this invention pertains without departing from the spirit of this invention or the intent, purpose, or purview of the appended claims.

In the accompanying drawings:

Fig. 1A is a wiring diagram illustrating the electrical control circuits;

Fig. 3 is a vertical sectional view of our machine, taken substantially along the line 3—3, Fig. 1, showing certain details of the punching elements per se;

Fig. 4 is a fragmentary sectional plan view, taken substantially along the line 4—4, Fig. 1, showing details of certain parts of the punch operating mechanism;

Fig. 5 is a vertical sectional view, taken substantially along the line 5—5, Fig. 1, showing some details of the control connections between the keyboard and some of the operating mechanisms;

Fig. 6 is a fragmentary vertical sectional view, taken substantially along the line 6—6, Fig. 5, showing certain details of a stop and lockout mechanism designed to prevent the simultaneous operation of more than one key;

Fig. 7 is a fragmentary horizontal sectional view, taken substantially along the line 7—7, Fig. 1, showing certain details of a mechanism for shifting the punching die elements transversely with respect to the card being punched;

Fig. 8 is a fragmentary elevational view showing certain parts in section, taken substantially along the line 8—8, Fig. 2, and illustrating certain elements of an escapement control mechanism for a card advancing means;

Fig. 9 is a transverse sectional view, taken on a vertical plane substantially along the line 9—9, Fig. 2;

Fig. 10 is a detail view showing, on a larger scale, certain escapement control elements represented in Fig. 9;

Fig. 11 is a fragmentary plan view on a somewhat enlarged scale of certain escapement control elements and card advancing elements seen in Fig. 9, this figure including a plan view, with certain parts shown in section, of the elements shown in Fig. 10; and Fig. 12 is a plan view of a card which may be used in connection with our invention.

Figure 1:
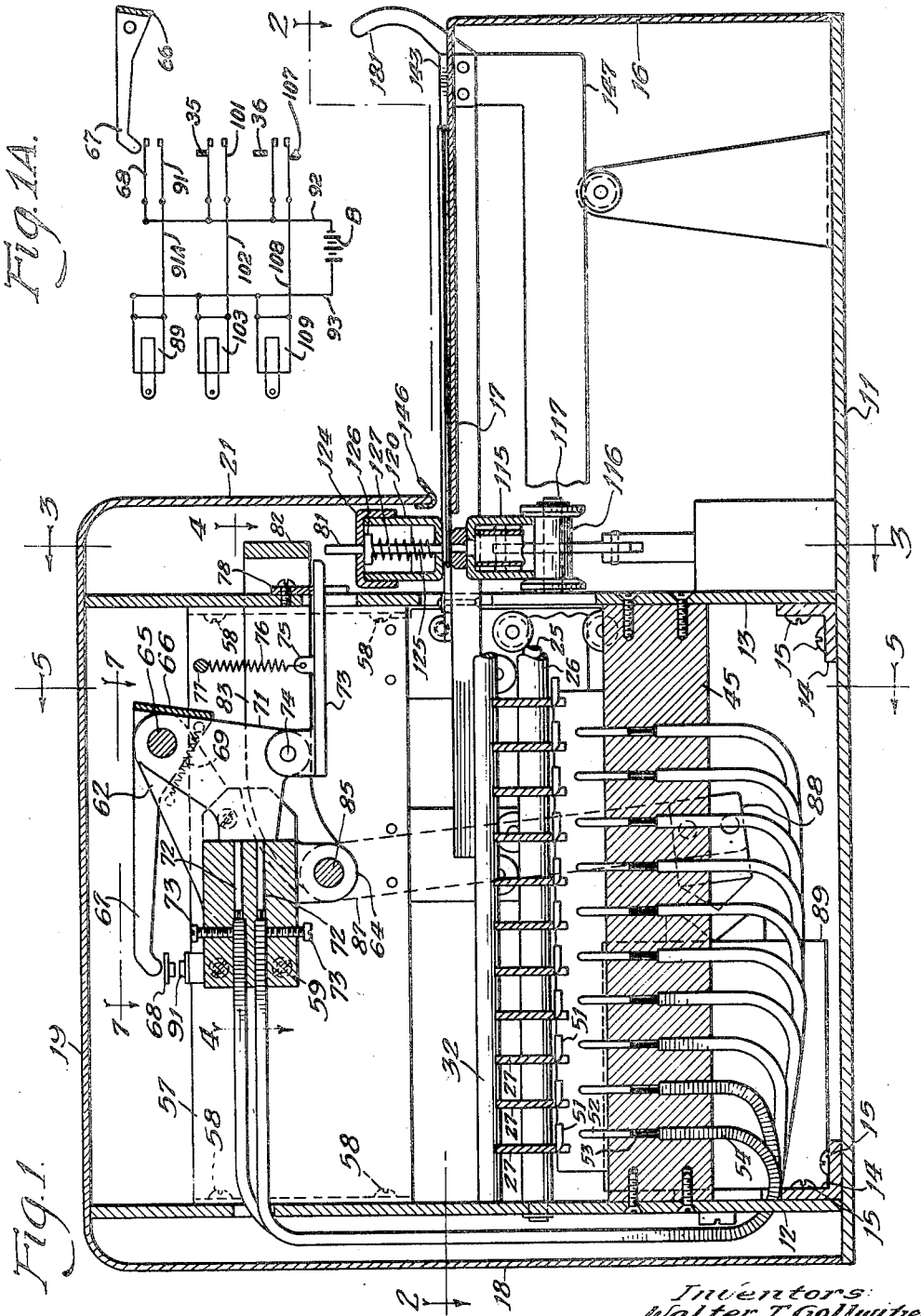
Fig. 1 is a transverse sectional view of our machine, taken on a vertical plane substantially along the line 1—1, Fig. 2, with certain details omitted to show the punching dies and principal punch operating means of our machine.
Figure 2:
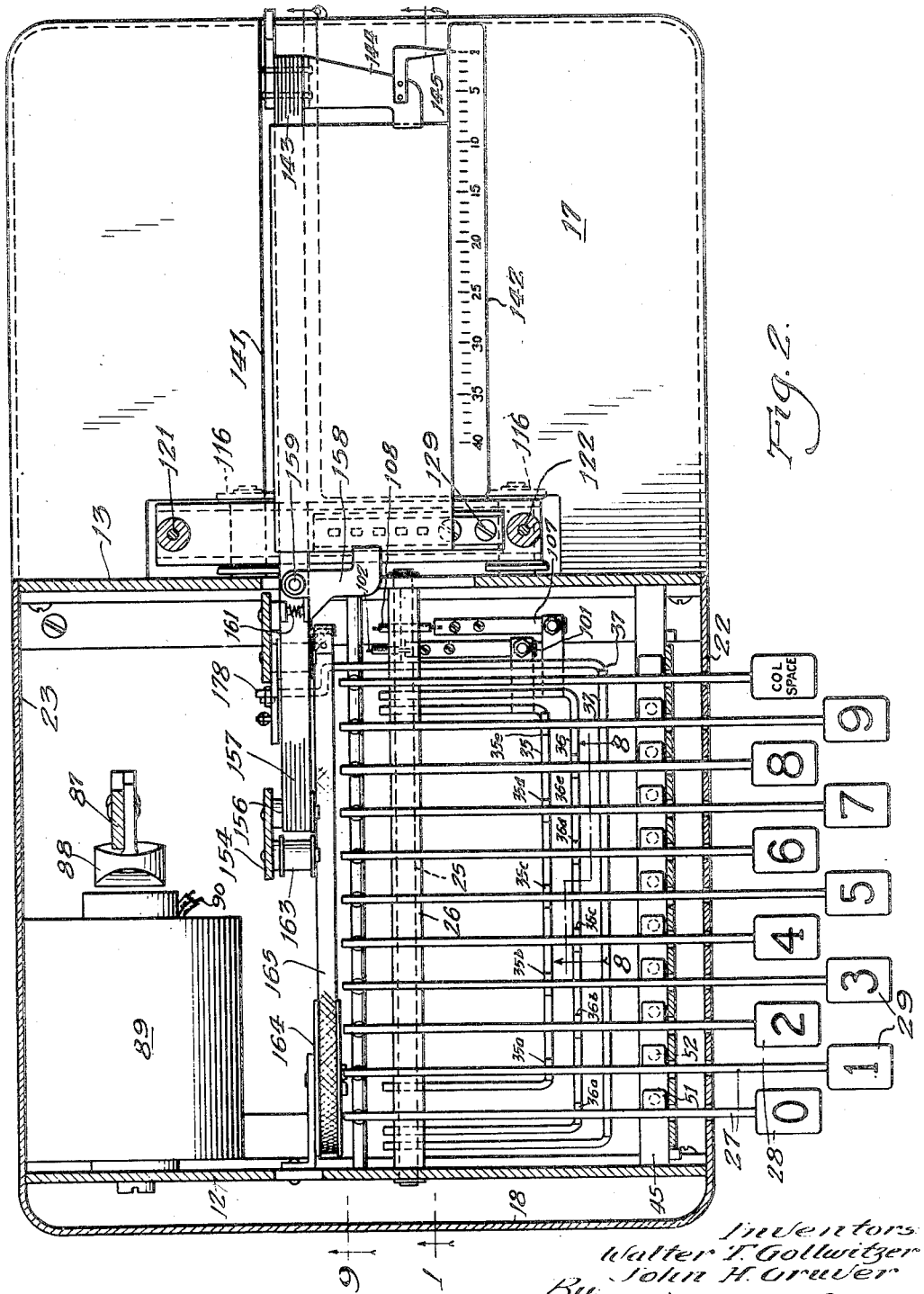
Fig. 2 is a horizontal sectional view of our machine, taken substantially along the line 2—2, Fig. 1.

Referring first to Figs. 1, 2 and 9, a machine is shown which is adapted to feed a card, such as is shown at C, Fig. 12, successively and intermittently through various punching positions between punching dies which will be described in detail hereinbelow. Depression of a selected key initiates operation of a punching die which produces a perforation at a desired index point or data-representing position on card C. As soon as the male punching die is withdrawn, an escapement device permits the card C to be advanced to a new punching station where another perforation is punched under the control of a selected key. This process is repeated until all desired positions in the card have been punched and the card is thereupon removed from the machine.

Referring now to Fig. 12, a card C of the kind contemplated by us for use in our improved punching system may have a number of vertical columns, or rows, R of index points or data-representing positions adapted to be perforated or punched out to indicate certain data to a sensing device in some other machine, such as a printing machine, calculating machine, sorting machine, or the like, as well known in the art. The card C, as shown in Fig. 12, may have ten digits, from 0 to 9, inclusive, printed thereon in consecutive order and arranged in a vertical column, and there are a large number of such columns, forty being shown in this instance although the number may be varied as desired. The ten digits in each column are located in data-representing positions or index points. Such positions or points can of course be punched and/or sensed without the digits or any other data being printed on the card C, the printed card being merely exemplary. Other data than numerical digits might be used, the consecutive order of such data being varied, portions might be printed and other portions left blank, and the arrangement of a group of points or positions to be selectively punched might be in a horizontal row instead of a vertical row, as is evident to those skilled in the art. However, as shown in Fig. 12, the card C is designed to be fed to our punching machine and advanced through the punching dies thereof in intermittent steps, a selected index pointed or data-representing position being punched each time the card is stopped between advancing steps, unless a vertical column is to be left unperforated, in which case the punching dies are not operated.

As shown in Fig. 12, the index points or data-representing positions on card C are closely spaced, the condensation of data serving greatly to reduce the dimensions of the card. The card size may be chosen as desired, one form which we have used successfully having an overall width of about one and one-half inches and an overall length of three and three-quarters inches, and for convenience such dimensions are indicated in Fig. 12, but this is to be taken only as being illustrative and not as a limitation. A card of such size, carrying forty vertical columns R of 10 digits or index positions each thus contains 400 index points or data-representing positions. It has a total area which is only a small fraction, that may be of the order of ten to twenty-five percent, of that of large conventional cards used in the prior art.

Perforations such as P are ordinarily rectangular in shape and of sufficient size to permit effective electrical contact to be made therethrough by sensing brushes, or to cooperate effectively with other sensing elements in the various types of machines and systems in which punched cards are used. It has been found that suitable perforations for the purposes mentioned must not be smaller than certain minimum dimensions. For example, the minimum satisfactory length for a perforation P is of the order of 0.1″. In a card of the size mentioned above, having an overall width of the order of one and one-half inches, the total length of a vertical column containing ten digits, or ten data-representing positions to be punched selectively is about one inch. Hence if two adjacent digits or positions in a single column were punched, the perforations would merge as shown $P_1$, $P_2$, Fig. 12. Ordinarily only one position in a single column is punched, but the merging of perforations $P_1$ and $P_2$ shows that it would not be practicable to arrange male punching dies closely enough together to mount ten of them in a line no longer than the height of a vertical column R. Each male punching element must, in order to make a clean cut perforation, be matched with a close fitting female die which surrounds the male die completely. Therefore, in the prior art, it has not been possible to provide punching dies spaced so closely as required for cards bearing condensed index points or data representing positions, and this is one important reason for the common use of large cards.

Our machine, as will be more fully described presently, provides a group of five die pairs, male and female, laterally shiftable as a group so that each pair may produce a perforation at each of two positions and under the control, selectively, of two separate keys. The perforations are of standard width and the various columns $R_1$, $R_2$, $R_3$, etc., are preferably spaced apart a distance at least slightly greater than the width of the perforations, so as to prevent merging of identical perforated positions in adjacent columns, as at $P_3$, $P_4$, or the interconnection at adjacent corners of perforations representing consecutive positions in adjacent columns, as at $P_5$, $P_6$, and $P_7$. In other words, the spacing from center to center of index points or data-representing positions in a row or column where only one is to be selected may be as little as, or even less than the dimension in a direction parallel to said row or column of the perforation to be made. In a direction at right angles to the row or column just mentioned, center to center spacing of index points to be punched is preferably at least slightly greater than the dimension of the perforation in the same direction. Otherwise perforations in two adjacent columns might be sensed by a single sensing means, giving erroneous results. Our method of providing perforations consists in using a limited number of punching tools (five as illustrated) selectively, to punch perforations in a greater number of positions (ten) by using each punching tool selectively in two different positions. Hence each punching tool performs the work of two, but since it occupies only the space of one, the index points or data-representing positions may be condensed at least fifty per cent in the direction where space for tools is a critical factor. While our machine, as mentioned above, and as described more fully below, provides two positions for each die, so that five pairs of dies can punch ten positions, it is obvious that the basic idea may be extended to other arrangements. Hence our invention comprehends the use of any small number of dies or tools to be shifted selectively to as many positions as required so that the product of the number of tools and the number of positions to which each may be shifted may be made large enough to provide perforations selectively in any reasonable number of positions. Thus two dies, each shiftable to any of five positions under selective control, could also perform the required operations of punching any of ten positions in a single vertical column on the card C, and the present invention contemplates the use of at least two dies or die-pairs.

Returning now to Fig. 1, the machine of our invention is mounted on a base plate 11 having upright frame members 12, 13, preferably of sheet metal secured thereto by means of angle members 14 and fastening means 15. The frame members 12, 13, extend from the front to the rear of the machine and support most of the operating mechanism to be described below. The base plate 11 extends a considerable distance to the right of plate 13, Fig. 1, to support certain card feeding means to be described below. A cover member 16 rises vertically at the right end of the base plate and is integral with a table top member 17 over which cards are to be fed to punching position. At the extreme left end of the base plate 11, another cover member 18 rises vertically, being integral with a top cover member 19 and a cover member 21 extending down over the right end of the upper part of the machine to a position near but spaced a small distance from the table top 17. The members 18, 19 and 21 are also integral with front and rear cover members 22, 23, respectively (Fig. 2), all the cover members being preferably shaped or pressed from suitable sheet metal.

A shaft running parallel to the front of the machine is mounted in the frame members 12, 13 and carries spacing means 26 between which are pivotally mounted control levers 27. As shown in Figs. 2 and 5 the levers 27 extend through slots in the front cover 22 and are equipped at their outer ends with finger tabs or keys 28, 29, alternate levers 27 being shorter to position keys 28 closer to the machine than the other keys 29 and in staggered relation to form a compact group of controls. There are six keys in the shorter group and five in the longer. The right hand key in the shorter group is utilized to control spacing mechanism to be described. The other keys control the operation of punching means and the keys are numbered 0 to 9, inclusive, corresponding to the punching positions they control. A tension spring 31, Fig. 5, is attached to the inner end of each of the levers 27 and its tension normally urges levers 27 clockwise against a stop rod 32 which runs across the machine, being mounted in frame members 12, 13.

Below the shaft 25 on which the key levers 27 are mounted is another and parallel shaft 33 which carries spacing collars 34 thereon. Mounted for pivotal movement on shaft 31, between spacing collars 34, are three bail members 35, 36 and 37 which are moved by certain of the key levers 27 at appropriate times. As shown in Figs. 2 and 8, bail member 35 has upstanding fingers 35a, 35b, 35c, 35d, and 35e which are respectively directly beneath key levers 27 for the digital positions 1, 3, 5, 7 and 9. Bail member 36 carries upstanding fingers 36a, 36b, 36c, 36d and 36e directly beneath key levers 27 for the digital positions 0, 2, 4, 6 and 8, respectively. Hence depression of any of the odd numbered keys 1, 3, 5, 7 or 9 depresses bail 35 whereas depression of any of the even numbered keys 0, 2, 4, 6 or 8 depresses bail 36. All of the levers 27, including the column space lever at the right, Fig. 2, depress bail 37 which controls the card feeding means to advance the card one column when any key is depressed, as will be explained below.

A supporting bar 41 is secured at its ends to the frame members 12, 13, extending transversely therebetween. This bar carries a group of freely hanging stop and lockout members which are pivoted thereto at 44 as seen in Fig. 6. The two end members 43 have sloping or cam-like surfaces on their inner edges and ten intermediate members 44 each have similar cam-like surfaces on both edges. The members 43, 44 are so shaped that key levers 27 may project freely between their upper portions, that is, when the key levers 27 are in their raised positions as seen in Fig. 5. The lower ends of members 43, 44 are wider and their width increases to a maximum at their extreme lower ends.

A transverse member 45 extends between frame members 12, 13, being secured thereto at its ends. This member is located directly below the bar 41, its front or left face, Fig. 5, being in vertical alignment with the front of bar 41. The member 45 has two pins 46 fixed thereto and projecting forwardly therefrom near the lower ends and outer edges of the depending stop and lockout members 43, as shown in Fig. 6. The pins are so located and the broad lower ends of the stop and lockout members 43, 44 are of such width that there is just enough space between the pins 46 for all the members 43, 44, plus a space equal to the horizontal thickness of one of the key levers 27. This construction permits depression of only one of the key levers 27 at one time.

Referring now to Fig. 1, each of the key levers 27, except the column spacing key on the right, carries a foot member 51 which is preferably integral therewith. Foot members 51 each extend horizontally, at right angles to the key levers 27 which carry them, to a position directly above a vertically movable pin 52 slidably mounted in the cross member 45. Each of the pins 52 contacts one end of a Bowden cable 53 which has its outer sheath 54 firmly anchored to the cross member 45 as by a set screw 55. Hence, when any of the key levers, except the column space key lever on the right, is depressed one of the Bowden cables is actuated.

Extending transversely across the machine above the key levers 27 and other operating parts thus far described are two parallel plates 56 and 57, Fig. 5. These are secured to frame members 12 and 13 as by screws 58 and are sufficiently rigid to support the punching means and associated parts which will now be described. A block member 59 is rigidly mounted between plates 56, 57 and it carries ears 61, 62 which extend upwardly to the right and downwardly extending ears 63, 64, as seen in Fig. 5. A shaft 65 extends through the ears 61, 62 and a bail member 66 is mounted on shaft 65 for pivotal movement. An arm 67 extends to the left from one end of the bail 66, its extreme end being directly located over the upper contact member 68 of an electric switch. A spring 69 secured to the bail 66 and anchored to one of the ears 61 or 62 tends to rock the bail 66 clockwise to the position shown in Fig. 1.

Pivoted on the shaft 65 intermediate the ears 61, 62 are five vertical plates 71 having downwardly and transversely extending portions. The left ends of these plates normally abut against a vertical surface on the right of block member 59, being normally urged to this position by contact at their right hand edges with the bail member 66 which, as mentioned above, is normally urged clockwise by spring 69. As shown in Fig. 1, the Bowden cables 53 are connected to pins 72 in block 59, the cables 53 and pins 72 being arranged in vertical pairs. In other words the two cables 53 actuated by key levers 27 for digital positions "0" and 1 are arranged one above the other in block 59, the pins 72 for both being aligned with the right edge face of one of the five plates 71. The other Bowden cables are similarly located. The sheaths 54 of the Bowden cables are anchored to the block 59 by set screws 73. Hence when one of the keys, as either the "0" key or the "1" key, is depressed, the pin 72 associated with one or the other through Bowden cables 53, pins 52 and foot members 51 moves the plate 71 counterclockwise about its pivot shaft 65. Hence, each of the five pivoted plates 71 is adapted to be moved counterclockwise by the depression of either of two keys. Referring to Figs. 1, 2 and 7, the plate farthest to the rear (top of Fig. 7) is moved by either the "0" or the "1" key, the second plate is moved by either the "2" or the "3" key, and so on. Movement counterclockwise of any of the plates 71 causes the bail 66 to rotate counterclockwise about the same shaft 65.

Each of the plates 71 carries an interposer pivoted to a lower corner thereof as at 74. Each interposer extends to the right through an opening in the frame member 13. At an intermediate position each interposer carries an upstanding ear 75. A spring 76 is connected to each of the upstanding ears 75, its upper end being connected to a transverse rod 77 which extends between the plates 56 and 57, being mounted therein at its ends. The springs 76 tend to rotate interposers 73 counterclockwise, Fig. 1, the right end portions of the interposers extending through guiding slots in a comb member 78 secured to frame member 13. Comb 78 permits vertical as well as horizontal movement of each interposer 73. When a plate 71 is rotated counterclockwise by one of the pins 72, associated with a Bowden cable and a key lever, the interposer carried thereby is projected to the right to overlie the head of a punch 81 and to lie under a punch actuating bail 82. The bail 82 is carried by arms 83, 84 non-rotatably secured to a shaft 85 mounted for rotary movement in the depending lugs 63, 64 of block member 59. Shaft 85 extends to the rear of the machine through a bearing member 86 secured to the machine frame and carries a depending arm 87 non-rotatably secured to its rear end as shown in Fig. 5. The lower end of the arm carries a block of magnetic material adapted to be drawn to the electromagnet 89 when the latter is energized.

Upon depression of a digital key lever 27, Fig. 2, a foot portion 51 thereon depresses a pin 52 which actuates a Bowden cable to move a pin 72 to the right, rocking the plate 71 associated therewith counterclockwise, positioning its interposer 73 above a punch stem 81 and beneath the punch actuating bail 82. As movement of the plate 71 continues the arm 67 is lowered to force the upper contact member 68 into contact with another contact member 91, thus completing a circuit to the electromagnet 89 as will hereinafter be described. Activation of electromagnet 89 causes it to draw the arm 87 clockwise, Fig. 1, to lower the bail 82 against a positioned interposer 83 to depress a punch pin 81. The punch pin 81 may assume either of two positions and is selectively positioned according to the digital key selected in a manner now to be described.

As shown in Figs. 2, 5, and 8, the odd numbered keys 1, 3, 5, 7 and 9 are arranged to depress bail 35 through upstanding lugs 35a, 35b, etc., as described above. Similarly, the even numbered keys are arranged to depress bail 36. Depression of bail 36 closes a switch 101 which is connected as will hereinafter be described to a solenoid 103. Plunger 104 of solenoid 103 is connected to one arm 105 of a three armed lever pivotally mounted at 106. Depression of bail 36, on the other hand, by one of the even-numbered keys closes a switch 107 which completes an electric circuit to a solenoid 109. The plunger 110 of solenoid 109 is connected to another arm 111 of the three-armed lever mentioned above.

The control circuits for the various solenoids 89, 103, and 109 are shown in Fig. 1A. Thus the contact 68 and one of the contacts of each of the switches 101 and 107 are connected in parallel by a wire 92 and appropriate branch leads to one terminal of a battery B, the other terminal of which is connected to one terminal of each of the solenoids 89, 103 and 109 by a wire 93 and appropriate branch leads. A wire 102 connects the other contact of the switch 101 to the other terminal of the solenoid 103, thus to enable the solenoid 103, to be energized by closure of the switch 101. Similarly, the solenoid 109 is placed under control of the switch 107 by extending a wire 108 between the other terminal of the solenoid 109 and the other contact of the switch 107. Finally a wire 91A extended between the contact 91 and the other terminal of the solenoid 89 places this solenoid under control of the switch 68—91.

The third arm 112 of the three-armed lever just mentioned is provided with a slot 113 which receives a pin 114 mounted on an inverted channel member 115 which carries the punching die assembly. The channel member 115 is mounted for reciprocal sliding movement on two lower guide rollers 116, mounted on shafts 117. Upper guide rollers 118 are also provided, being mounted on shafts 119 and a channel member 120, secured to the lower inverted channel member 115 as by bolts 121, 122 and spacers 123, is guided by the upper rollers in movement with the lower channel member as shown in Figs. 3, 4 and 9.

An inverted channel member 124 overlies the middle part of channel member 120, being detachably secured thereto in any desired manner. Channel member 124 is provided with five openings for the upwardly extending stems 81 of the punches 125. Channel member 120 is provided with a similar number of aligned openings for the lower ends of the punches 125. Each punch 125 is provided with a cross pin 126 against which a compressed spring 127 surrounding the punch urges the punch upwardly until the pin stops against the under surface of the channel member 124 as shown in Fig. 1.

A female die member 128 is secured to the upper surface of the lower channel member 116 as by screws 129, and contains five openings to receive the punches 125. The channel member 115 itself has openings aligned with and somewhat larger than the die openings in member 128 to permit easy clearing of punchings, and a discharge chute 131 is attached thereto to carry the punchings to a discharge point.

As will be evident from the foregoing description, the die assembly, under the control of the three-armed lever 105, 111, 112 is adapted to be set in one of two alternative positions, depending upon which of the solenoids 103 or 109 is actuated. If a key representing an odd-numbered digital position is operated, solenoid 103 is activated and the punch assembly is moved forwardly, or to the left as seen in Fig. 3. If an even-numbered key is operated, solenoid 109 is activated and the punching assembly moves to the rear or to the right, when it is shown in Fig. 3. The first punch, at the right in Fig. 3, perforates a "0" position when it is in its rear position or a "1" when in forward position. The second punch perforates a "2" in its rear position or a "3" in its forward position. The third punch perforates a "4" or a "5" the fourth a "6" or a "7" and the fifth an "8" or a "9," as shown in Fig. 12. To insure accurate positioning of the punch assembly in either the rear or the forward position two notches 132 and 133 are provided in a lower edge of channel member 116. A sharp nosed spring urged detent 134 is pivoted at 135 to an appropriate stationary frame member, as the member 13.

As shown in Figs. 1, 2 and 9, means are provided for feeding a card step by step through the punching dies. As shown in Figs. 1 and 2, the feed table top at the right is provided with horizontal guide members 141 and 142 positioned apart a distance corresponding to the width of a card. The front guide member 142 preferably includes a scale marked in graduations corresponding to the column positions on the card to be punched. A slot is provided in the table top between the two guides to receive a sliding feeder 143 which extends from below the table and carries a grooved pushing member 144. The pusher 144 preferably carries a pointer 145 which cooperates with the scale on guide 142 to indicate the column being punched.

At the punch assembly, the cover member 21 is cut off above the table to leave a feeding entrance to the punches and a guide member 146 is attached to facilitate entrance of the cards into the punch assembly.

The sliding feeder 143 is carried by a bar 147 which rides on its edge on guide rollers 148, 149 and 151 mounted in suitable brackets 152, 153 and 154 respectively. Upper guide rollers 155 and 156, mounted on brackets 153 and 154 are provided for the upper edge of the bar 147. A parallel bar 157 lies substantially flush with the table top and carries a front card positioning member 158 pivoted thereto at 159 and urged counterclockwise to a card holding position by a spring 161, Fig. 2. By means of card holding members 144 and 158 positive control of the card and accurate positioning are assured. The bar 157 is guided by rollers 162 and 163 mounted on brackets 153 and 154 respectively.

The means just described comprise a card feeding carriage which is moved to the left as punching progresses to successively position the various columns of the card in the punching dies. Feeding movement is imparted by a spring drum 164 of a well known type, connected by a tape 165 to the bar 147. An escapement feed is provided comprising a rack bar 167 attached to the bar 147 and a pair of escapement pawls 168 and 169. The pawls 168 and 169 carry detent members 171 and 172 which coact alternately with teeth on the upper and lower edges of the escapement bar 167. The pawls 168 and 169 are pivoted to the frame and to each other by a pin 173. The upper pawl carries a pin 174 which limits closing motion between the two pawls. A spring 175 urges the pawls toward a closing position with respect to each other and urges both toward the edges of the escapement or rack bar 167. A link 176 is pivoted to the upper pawl 168 at 177, the lower end of said link being pivotally connected to the rearwardly extending arm 178 of the column spacing bail 37 previously mentioned. An eccentric bolt connection is provided at this point for adjustment purposes.

For restoring the feeding carriage to initial position a handle 181, Figs. 1 and 9, is provided. In operation, the operator grasps the handle, pulls the feeding carriage assembly to its extreme right position where it is stopped with the pointer opposite the first column member of the scale on the card guide 142. The operator then inserts the end of a card into the slot beneath member 146, against the left positioning stop 158 and snaps the right end into the groove in the pusher 144. Thereupon he operates the keys to punch one position in each desired column. If a column is to be passed without punching he operates the column space key. Each of the keys operate the spacing bail 37 which in turn operates the escapement mechanism, regardless of which key is punched. If a digital key is pushed, either the bail 35 or the bail 36 is actuated, depending on whether the number is odd or even. The punching assembly is correspondingly shifted to the front or the rear, Fig. 3, the appropriate interposer 83 is moved to the right over a punch stem, switch 68—91 is closed to activate the electromagnet or solenoid 89, and the punch activating bail 82 descends to operate the punch that lies under an interposer. Because of the stop and lockout mechanism 43, 44, 46, only one key can be depressed in each position of the card.

After the card has been punched in all the desired columns, the feeding carriage is withdrawn to the right, the card is removed, and another card is inserted for new card punching operations.

From the foregoing description it is apparent that we have invented a simple, small and compact punching machine for operating on cards having closely spaced data-representing positions. The male punching dies 125 may be as wide or even wider than the spaces which separate them and their lateral movement may be approximately equal to the space between them or to the greatest width, corresponding to the vertical length of a perforation P in card C, Fig. 12, Hence the five dies are adapted to perforate ten mergable positions, and adequate cutting walls are provided on the female die member 128 to insure clean cut perforations.

It will be apparent that while we have described a particular embodiment of our invention, such embodiment is exemplary only. Changes in construction and arrangement of various parts may be made and substitutions, alterations and modifications may be made and it is intended to cover all aspects of our invention as far as they fall within the purview of the following claims.

We claim:

1. A device for punching closely spaced positions on a card or the like comprising plural punching dies spaced at greater intervals than said closely spaced positions, and each mounted for lateral shifting a distance substantially equal to the spacing between selected ones of said closely spaced positions, means for operating said dies selectively, and means for shifting said dies laterally to position them for punching selected ones of said closely spaced positions.

2. A device for selectively punching closely spaced positions on a card or the like comprising means for positioning a card, a group of spaced die units mounted for lateral movement with respect to said card, the space between adjacent die units in said group being greater than the space between adjacent of said closely spaced positions, means adapted to be selectively controlled by an operator to move said group of die units laterally, interposer means selectively movable to operative position with respect to each of said die units, and die operating means operable through said interposer means to operate a die unit.

WALTER T. GOLLWITZER.
JOHN H. GRUVER.

REFERENCES CITED

The following references are of record in the file of this patent:

UNITED STATES PATENTS

| Number | Name | Date |
| --- | --- | --- |
| 1,780,621 | Lasker | Nov. 4, 1930 |
| 2,010,642 | Peirce | Aug. 6, 1935 |
| 2,091,435 | Elliott | Aug. 31, 1937 |
| 2,189,027 | Fuller | Feb. 6, 1940 |
| 2,194,305 | Hirschler | Mar. 19, 1940 |
| 2,210,552 | Maul | Aug. 6, 1940 |
| 2,265,222 | Benes | Dec. 9, 1941 |
| 2,278,118 | Pitman | Mar. 31, 1942 |